United States Patent Office | 2,887,453
Patented May 19, 1959

2,887,453

SEMI-CONDUCTOR ACTIVATED WITH DISSOCIATED AMMONIA

Ernst Billig, Esher, and Denys Bromley Gasson, Mortimer, near Reading, England, assignors to Siemens Edison Swan Limited, London, England, a British company No Drawing. Application September 13, 1957
Serial No. 683,720

Claims priority, application Great Britain
September 14, 1956

2 Claims. (Cl. 252—62.3)

This invention relates to the preparation of semi-conductor materials.

This invention is concerned with activation by the diffusion technique, whereby a suitable activator element is introduced into the lattice of the semiconductor crystal in such a manner as to convert its electrical characteristics to the opposite polarity. For instance, in the case of group IV semi-conductors, suitable activators are elements of the adjacent groups in the periodic table, group III elements imparting to the semi-conductor p-type conductivity, and group V imparting n-type conductivity. In the diffusion technique the appropriate doping agent is brought into contact with the surface of the semi-conductor, which is then raised to a sufficiently high temperature so that diffusion in the solid can take place at a reasonably fast rate. A layer of considerable depth below the semi-conductor surface—say in the order of $10^{-3}$ cm.—can thus be doped within a reasonably short time.

Of the various donor elements in group V (for instance nitrogen, phosphorus, arsenic and antimony), phosphorus and arsenic, or their compounds, are most frequently used for diffusion from the gaseous phase in view of their conveniently high vapour pressure. They are, however, extremely obnoxious, so one of the most convenient gases left for doping to n-type polarity would be nitrogen gas. This, however, has been found impractical, apparently because the gas cannot be dissociated into its atomic form at the temperature to which the semi-conductor material—germanium or silicon—can be raised without melting.

Accordingly it is an object of the present invention to provide an improved method of introducing nitrogen as an activator.

According to the present invention the method of introducing nitrogen as an activator into semi-conductor materials of group IV comprises heating the semi-conductor material to a temperature somewhat below its melting point, applying ammonia gas to the surface of the heated semi-conductor so that the ammonia dissociates and atomic nitrogen diffuses into the semi-conductor, and maintaining the gas in contact with the solid for a time sufficient for diffusion to proceed into the solid to the required depth.

The invention has particular application where germanium, silicon or silicon carbide are used as the semi-conductor materials.

The invention is based on the fact that the dissociation energy of ammonia is very much lower than that of nitrogen gas and indeed so low that the concentration of atomic nitrogen resulting from the reaction:

$$2NH_3 \rightleftharpoons 2N + 3H_2$$

is sufficiently high for the solid semi-conductor, when raised to a temperature somewhat below the melting point to be converted to n-type material.

What we claim is:

1. The method of introducing nitrogen as an activator into semi-conductor materials of group IV comprising heating the semi-conductor material to a temperature below its melting point but sufficiently high for ammonia to dissociate into its constituent elements, applying ammonia gas to the surface of the heated semi-conductor so that the ammonia dissociates and atomic nitrogen diffuses into the semi-conductor, and maintaining the gas in contact with the solid for a time sufficient for diffusion to proceed into the solid to the required depth.

2. The method of introducing nitrogen as an activator into semi-condutcor materials of the group consisting of germanium, silicon and silicon carbide comprising heating the semi-conductor material to a temperature below its melting point but sufficiently high for ammonia to dissociate into its constituent elements, applying ammonia gas to the surface of the heated semi-conductor so that the ammonia dissociaes and atomic nitrogen diffuses into the semi-conductor, and maintaining the gas in contact with the solid for a time sufficient for diffusion to proceed into the solid to the required depth.

References Cited in the file of this patent

UNITED STATES PATENTS

| | | |
|---|---|---|
| 2,704,708 | Welker | Mar. 22, 1955 |
| 2,834,697 | Smits | May 13, 1958 |